Sept. 17, 1963 C. W. PFLIEGER 3,103,818
THERMOSTAT
Filed March 28, 1958 2 Sheets-Sheet 1

INVENTOR.
CHARLES W. PFLIEGER
BY John P. Murphy
ATTORNEY

Sept. 17, 1963  C. W. PFLIEGER  3,103,818
THERMOSTAT
Filed March 28, 1958
2 Sheets-Sheet 2
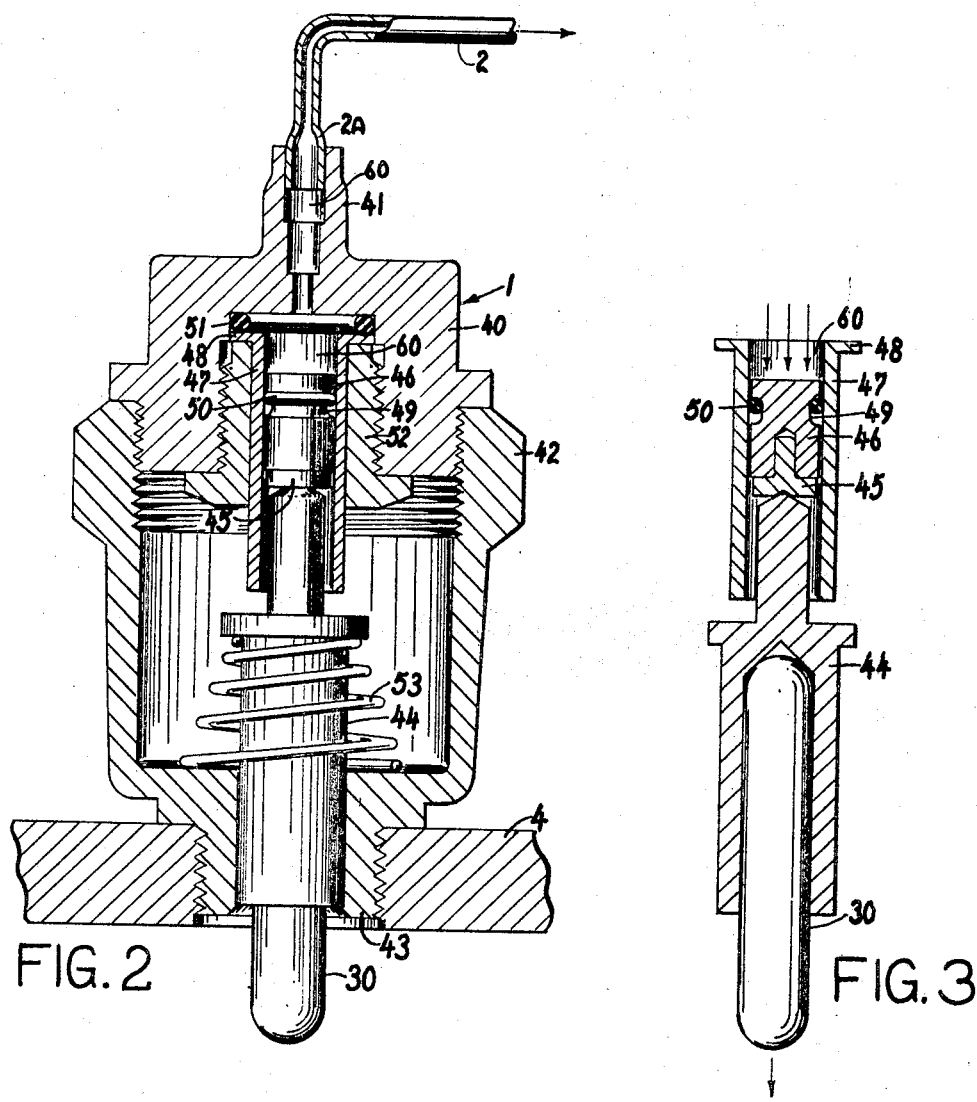
FIG. 2
FIG. 3
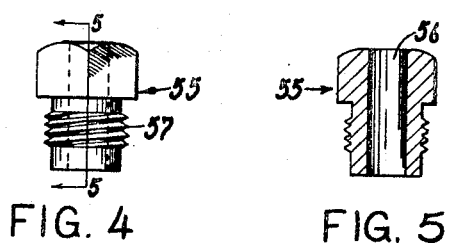
FIG. 4
FIG. 5
INVENTOR.
CHARLES W. PFLIEGER
BY John P. Murphy
ATTORNEY United States Patent Office 3,103,818
Patented Sept. 17, 1963

3,103,818
THERMOSTAT
Charles William Pflieger, New Hartford, N.Y., assignor to The Partlow Corporation, New Hartford, N.Y., a corporation of New York
Filed Mar. 28, 1958, Ser. No. 724,616
1 Claim. (Cl. 73—368.3)

This invention relates to temperature controls, and more particularly to a thermostat for controlling the actuating of a controlling or regulating apparatus.

In the past, several types of thermostats have been presented for a wide variety of purposes. All of these are actuated by some type of thermal element in response to a change in temperature at the control point. Such thermal elements may be mechanical means such as bimetal strips, electrical means such as a thermocouple which supplies a small amount of current to the thermostat, or expanding fluid types, or expanding solid material types. It is obvious that the mechanical types are subject to corrosion, and are therefore extremely limited in their adaptation to application. The electrical types are sensitive in their operation. However, they are also delicate and subject to corrosion. In addition, they are best adapted for controlling electrical supply, such as to a furnace, and contain many parts which may easily get out of adjustment. The expanding fluid types heretofore presented have been of the tube type with a flat curved tube adapted to straighten out on increase of fluid pressure, the metallic bellows type adapted to lengthen in response to increase of fluid pressure, and the diaphragm type having a flexible diaphragm associated with a movable plunger and adapted to move the plunger in response to increase of fluid pressure. The disadvantage of the tube or bellows types is the lack of usable power derived from the straightening out of the tube or the lengthening of the bellows in response to temperature changes. An apparatus actuated by thermal elements of this type must be adapted by means of linkages to be actuated by a very negligible amount of power. The flexible diaphragm type has sufficient power, but does not exhibit a straight line relationship between equal increments of fluid expansion relative to consequent piston displacement or plunger displacement. For this reason, control dials and indicating scales must be graduated logarithmically or with increasing or decreasing increments of graduation, instead of with equal increments or equal divisions throughout. Furthermore, with the above fluid expansion types, relatively large thermal bulbs were required at the control point, being expensive, and often being cumbersome with respect to the controlled media. Furthermore, certain applications of the above mentioned types have required protective or isolated mountings in order that they may be protected from the effects of corrosion, bumping, and the like.

It is accordingly, a prime object to provide a thermostat for actuating a control apparatus which exhibits a straight line relationship between equal increments of fluid expansion and consequent equal piston displacement within the thermostat.

It is a further object to provide a thermostat, the operation of which permits the graduation of control dials and indicating scales in equal diversions or increments.

It is a further object to provide a thermostat which provides a substantial amount of usable power and is adapted to provide this power even with the use of a thermal bulb of smaller relative size.

A further object of this invention is to provide a thermostat which is adapted to be used in adverse conditions so that the elements of the thermostat are substantially isolated from becoming affected by corrosion and the like.

In carrying out the foregoing and other objects, there is provided a thermostat for controlling the actuation of valves, switches, slide wires, mechanical linkages, control or regulatory apparatus and the like in response to a temperature change at the control point in the controlled media. The thermostat is adapted to regulate the temperature of various media by controlling the actuating of apparatus employed in controlling the temperature of various media in one way or another. Expansion or contraction of fluid in response to a change in temperature causes displacement of the fluid and the resultant conversion to mechanical power in increments equal to the displacement of the fluid for actuating the control apparatus.

The above, and other objects and advantages will become apparent from the following description, with reference to the accompanying drawings, in which:

FIGURE 2 is an enlarged longitudinal cross section of a thermostat for the system of FIGURE 1.

FIGURE 3 is an enlarged fragmentary cross section of a portion of the invention.

FIGURE 4 is an elevation of a modification of the thermostatic control, in part.

FIGURE 5 is a cross section of the modification taken on line 5—5 in FIGURE 4.

Figure 1:
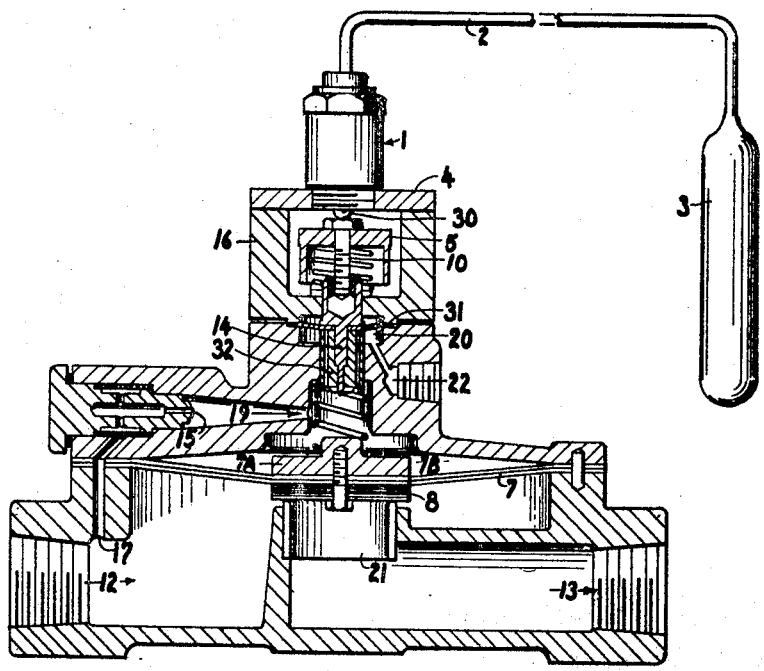
FIGURE 1 is a longitudinal cross section of a temperature control system adapted to be actuated by the present invention.

In accordance with FIGURE 1, a valve is illustrated which is particularly well adapted for outdoor applications in the oil industry, where it is necessary that a volume of oil or other media be maintained at a given temperature. The valve has an inlet 12, and an outlet 13, adapted to be connected to a supply of fuel (not shown) for heating the oil. The valve has a flexible diaphragm 7 which closes the valve by means of the main disc valve 8 being seated on a seat in the main gas chamber 21. Bleed gas flows from the incoming supply of gas upwardly through the passage 17, through an orifice 15, through a passage opening 19 to a chamber above the diaphragm 7, this chamber being designated by the numeral 7B. The flow of bleed gas through the orifice 15 is negligible, being sufficient only to equalize the gas pressure above and below the diaphragm 7.

A diaphragm controlled pilot valve operates between chamber 7B and chamber 20, which is vented to the atmosphere or to a burner through passage 22. To open the main valve 8, the pilot valve diaphragm 31 is caused to be lifted off its seat in response to thermostatic action. This allows gas pressure in chamber 7B above the diaphragm 7 to escape into pilot valve chamber 20 and out through passage 22. With the pressure above the diaphragm 7 thus decreased, pressure beneath the diaphragm 7 in chamber 21 forces the diaphragm 7 up off its seat, allowing fuel to flow from the inlet 12, through the main chamber 21, and out through outlet 13 to the burner or the like (not shown). The orifice 15 is a small size, allowing a very small amount of bleed gas to flow through the passage opening 19 into chamber 7B. Due to this, there is little waste of gas through the pilot valve, and the pilot valve need be opened only slightly to cause the decrease in gas pressure in chamber 7B to actuate the main valve.

To close the main valve 8, thermostatic action forces the diaphragm 31 downwardly back onto its seat, causing the incoming flow of bleed gas from the orifice 15 to accumulate in chamber 7B until the pressure is equalized above and below the diaphragm 7. Due to the size of chamber 7B, this happens very quickly, and the spring loaded weight 7A forces the diaphragm 7 downwardly onto its seat, closing the main valve 8. The gas supply to outlet 13 is thus shut off.

A thermal bulb 3 is disclosed, the bulb being placed at the correct control point in the media being controlled. In the application illustrated, the bulb 3 is preferably filled with mercury. However, it will be obvious that any suitable expansible fluid may be used according to requirements. A capillary tube 2 connects the thermal bulb 3 to the thermostatic element 1, and is also mercury-filled. As the temperature of the media (not shown) decreases, the mercury in the bulb contracts, and the mercury in the capillary 2 flows, to some extent, back into the bulb 3, decreasing any pressure applied to the element 1. As the temperature of the media increases, the mercury expands, applying more pressure to the thermostatic element 1.

With reference to FIGURE 2, the thermostatic element 1 is illustrated as being contained in a housing 42 having a head 40 fastened thereto such as by a threaded connection. One end of the head 40 is formed into a nipple 41 adapted to have the end of the capillary 2 attached and hermetically sealed thereto by any well known conventional method, such as brazing, welding or the like.

At the opposite end of the element 1, the end of the housing 42 is formed into an extended portion which is threadably and detachably mounted in the mounting plate 4 of the control system. A central hole is formed in this extended portion 43, and the hole is adapted to have a plunger stem 44 slidably disposed therein. The stem 44 is spring loaded by the spring 53 and is thus adapted to slide freely in the central hole, and the direction of movement of the stem 44 is guided by the hole. The reduced-diameter upper end of the plunger stem 44 is disposed so as to bear against a plunger bearing plate 45, FIGURES 2 and 3. The plate 45 is detachably inserted into an opening in the plunger bearing 46, and the bearing plate 45 and the bearing 46 are adapted to slide up and down in a sleeve 47. This sleeve 47 has a flange 48 at its upper end.

The central portion of the head 40 has a central hole formed therein which is adapted to receive the above named components. A resilient O ring is disposed at the upper end of the hole in the head 40. The sleeve 47 is placed with the flange 48 against the O ring 51, and a plunger sleeve lock screw or nut 52 is screwed into the threaded central opening in the head 40 so that the end of the screw 52 bears against the flange 48. The flange 48 is thus forced against the O ring 51 in sealing relationship therewith, and the whole assembly forms a sealed cylinder. A mercury chamber 60 in the nipple 41 connects the cylinder with the capillary tube 2.

The plunger stem 44, bearing plate 45, and bearing 46 are asssembled as described above. Around the circumference of the bearing 46 is a recess 49, which is adapted to have received therein a resilient O ring 50. This assembly is placed in the sleeve as illustrated in FIGURES 2 and 3.

It will be noted that the head 40, the O ring 51, sleeve 47, bearing 46 and the O ring 50 are formed from material which is adapted to be chemically resistant to mercury, or as the case may be, to whatever expansible fluid may be used in the bulb and capillary. This practice is well known to those skilled in that art, and will not be described further.

The chamber 60 is filled with mercury, being in communication with the capillary and the bulb, the capillary being sealed into the nipple 41.

A plunger 30 is placed in the central hole in the plunger stem 44, which will be further described, and the element 1 is placed in the carrier plate 4 as described above. It is pointed out that the spring 53 retains the assembly of components against the volume of mercury in the chamber 60 so that there is at all times a positive straight line connection of elements from the mercury filled thermal bulb 3 to the plunger 30.

With reference to FIGURE 1, it will be seen that the plunger 30 bears against the top of a control dial stem 10. This stem 10 is adjustably screwed into a pilot valve stem 14, to which is fastened the pilot valve diaphragm 31. It will become obvious that the housing of the thermostatic assembly 16 is adapted to seal the edges of the diaphragm 31 to the edge of the chamber 20, and that the pilot valve stem 14 is adapted to raise and lower the central portion of the diaphragm 31 from and to its seat in the pilot valve. A temperature setting dial 5 is mounted at the upper end of the stem 10, and the whole is spring loaded by means of a spring disposed between the interior of the dial 5 and the housing of the assembly 16. By this means, the whole assembly is constantly urged upwardly against the plunger 30.

In setting up the system initially, it is first determined at what temperature range the media being controlled is to be maintained. The assembly 16 and the units 1, 2 and 3 are formed in different dimensional values according to temperature ranges. The proper assembly being selected, the assembly 16 is fastened to the body of the valve so that the diaphragm 31 is hermetically or atmospherically sealed around its periphery. The component linkages throughout the thermostatic system are then adjusted so that each component bears positively against the adjacent component. The temperature set dial 5 is then adjusted to the desired temperature, say for instance, 150° (not shown).

The thermal bulb 3 is placed in the media to be controlled. Assuming that the temperature of the media is below 150°, the mercury in the bulb 3 contracts, and a small amount of the mercury in the chamber 60 is displaced through the capillary 2 into the bulb 3 so that the pressure of the mercury is equalized throughout. As the mercury in the chamber 60 is displaced, the spring 53 urges the stem 44 against the plate 45, which is urged against the bearing 46. The bearing or piston is displaced upwardly in the chamber 60 a distance equal to the volume of mercury displaced. It will also be noted that the spring 53 also aids in displacing the mercury substantially immediately. As the stem 44 moves upwardly, the plunger 30 is thus retracted an equal distance into the housing 42 of the element 1.

As all of the above occurs, the spring-loaded pilot valve stem 10 is urged upwardly against the plunger 30, lifting the diaphragm 31 off of its seat. As hereinbefore described, this will allow the bleed gas in chamber 7B to escape into chamber 20. The main valve 8 will then open, allowing fuel to pass through chamber 21, through outlet 13 to the burner or the like which is adapted to head the media being controlled.

When the media reaches the preset temperature of 150°, the thermostatic assembly will close the main valve 8, shutting off the fuel supply to the burner.

It is pointed out that, when the temperature set dial 5 is adjusted, the length of linkage in the assembly 16 is adjusted, thus controlling the amount of travel required by the plunger 30 to open or close the valve diaphragm 31. The distance that the plunger 30 is adapted to travel is limited only by the amount of mercury displaced in the chamber 60.

Thus, the required, preset temperature being reached, the mercury in the bulb 3 expands, displacing mercury through the capillary 2 into the chamber 60. The bearing 46 is thus forced downwardly by the mercury being displaced, and bears against the bearing plate 45, which bears against the top end of the plunger stem 44, forcing it downwardly against the urging of the spring 53, and ultimately extending the plunger 30 downwardly beyond the housing 42 of the element 1. The plunger 30 bears against the top of the pilot valve stem 10 which moves against the urging of its spring to close the pilot valve diaphragm 31 on its seat. Bleed gas thus accumulates quickly in the chamber 7B to equalize the pressure in chamber 7B and 21. The spring loaded diaphragm 7 thus closes the main valve 8 and shuts off the supply of fuel through outlet 13.

From the operation of the thermostatic assembly, it will become apparent that there exists a straight line relationship of volume of mercury displaced with resultant movement of components to actuate the control mechanism or apparatus. Greater accuracy during operation is achieved in that the temperature being controlled is adapted to be maintained "on the line."

Figure 6:
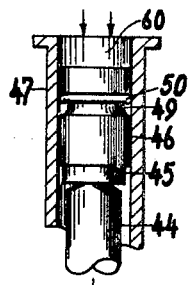
FIGURE 6 is a cross section of a portion of the thermostatic control, illustrating the operation thereof.
Figure 7:
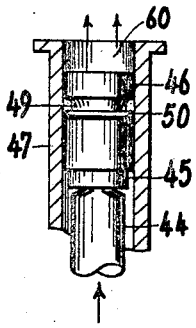
FIGURE 7 is a cross section as in FIGURE 6, further illustrating the operation of the control.

FIGURES 6 and 7 illustrate the action of the bearing 46 and its O ring 50. In FIGURE 7, as the mercury (indicated by the arrows at the top of the figure) is displaced out of the chamber 60, the bearing 46 moves upwardly. It is seen that the recess 49 is longitudinally greater than the diameter of the O ring 50. As the bearing moves upwardly the O ring, which is squeezed in tight sealing relationship between the recess 49 and the sleeve 47, is adapted to roll between the recess and the inner wall of the sleeve to some extent. This eases any effect of friction between the O ring and the recess or the wall of the sleeve, and allows the bearing to move more easily, thus moving more responsively to thermostatic action. As the bearing moves upwardly, the O ring will roll to the bottom end of the recess.

In FIGURE 6, the mercury is being displaced back into the chamber 60, and is forcing bearing 46 back downwardly through the sleeve 47. Here, the converse of the action of FIGURE 7 takes place. As the bearing 46 moves downwardly, the O ring rolls to the upper end of the recess 49, thus easing the effect of friction between the O ring and the sleeve 47.

FIGURES 4 and 5 illustrate a modification of a portion of the invention. Cylinder 55 is a one-piece unit adapted to be used in place of the combination of the sleeve 47 and the locking screw or nut 52. It is seen that the lower end of the cylinder 55 is adapted to be placed against the O ring 51 as is the flange 48 of sleeve 47, and the extended central opening 56 is adapted to receive the bearing 46 in operative relationship, as in the use of the sleeve 47 and the locking screw 52. The cylinder 55 is provided with screw threads 57 as is the lock screw 52 so that the cylinder 55 may be placed in the central opening in the head 40 of the element 1, with the end bearing in sealing relationship with the O ring 51. Of course, the cylinder 55 is formed from material which is resistant to any chemical action by the mercury.

It will be noted that the adjustment of temperature set dial 5 adjusts the overall length of the linkage in assembly 16, which includes the stem 14 and the control dial stem 10. In doing this the tension on the loading spring for dial 5 is varied. If, for instance, the length of the linkage is decreased, the tension of the spring of dial 5 is increased, thus allowing the stem 44 in the element 1 to extend down slightly. This results in a control setting for a higher temperature. A greater expansion of mercury in bulb 3 is required to actuate element 1, due to the increased tension of the loading spring of dial 5.

In lengthening the linkage in assembly 16, the direct opposite takes place. A lesser degree of expansion of mercury is necessary to actuate element 1, due to the need for less pressure to counteract loading spring of dial 5. Thus, it is seen that the whole thermostatic assembly would be responsive.

It will now become obvious that we have provided a thermostatic control which is simple in construction, and which is direct acting. There is exhibited a straight line relationship between equal increments of fluid expansion and consequent equal piston displacement within the thermostat. This is due to the arrangement of components, wherein as the mercury in the bulb expands, it is displaced into a cylinder, causing a piston to be displaced in the cylinder in the same direction as the fluid being displaced. As the bearing is displaced, a combination of elements all move in the same direction to accomplish the desired action—actuate a control, regulator, linkage, whatever the application may be. It will also be seen that the thermostat acts as a hydraulic motor, thus providing usable power for operating the associated apparatus with which it is used. It will become further apparent that, even in application in adverse conditions, long life of operation will result, with a minimum of maintenance requirement.

In an application such as in FIGURE 1, the thermostatic element 1 is adapted to be removed temporarily from the associated apparatus without it being required that the main fuel supply be shut off, or without any further disassembly of other portions of the apparatus. The element 1 may be removed for longer periods, provided that some means is used to maintain the pilot valve in the closed position.

It is generally accepted in the art that a thermostatic assembly made for an extremely wide range of temperature control tends to be inaccurate in its controlling action, in that it will not accurately hold the temperature "on the line." Accordingly, the element 1, and its associated assembly 16 are preferably made for a range of operation which is not inclusive of the entire operable range for which it is adapted. If it is desired at any time to change the range of temperature control, the operator need only replace the assembly 16 and the element 1, along with the capillary and bulb, as a unit with another unit operating in the desired temperature range. As is known in the art, the different range of operation is afforded by dimensional changes in the element, bulb, length of the capillary, and the linkage in assembly 16.

A modification of the invention being shown and described for the purpose of illustration only, it is to be understood that the invention is not to be limited thereto, but is to be construed as fairly falls within the true spirit and scope of the appended claim.

I claim:

A thermostatic element for actuating an apparatus in response to a change in temperature comprising; a housing and a head attached thereto, said housing having an extended portion for attaching to said apparatus and a central hole in said extended portion, said head having a nipple at one end with a chamber therein; a sleeve with a flange thereon received in a central opening in said head and retained thereat by a lock screw fastened in the central opening in said head, said flange bearing against an O ring in sealing relation and forming a cylinder connected with said chamber in said nipple; a plunger bearing and a plunger bearing plate being received slidably in said cylinder, said bearing plate bearing against one end of a plunger stem, the other end of said plunger stem being disposed through said central hole in said extended portion of said housing and slidably therethrough, said plunger stem being urged by spring means against said bearing plate; a recess in said plunger bearing and an O ring in said recess in sealing relationship between said recess and the inner wall of said sleeve; a capillary tube attached to said nipple in sealing relationship therewith, said capillary tube connecting said chamber in said nipple with a thermal bulb, said bulb and said capillary tube and said chamber being filled with fluid adapted to expand and contract in response to a change in temperature; whereby fluid is adapted to be displaced into and out of said chamber and said cylinder against said plunger bearing for extending and retracting said plunger stem through said extended portion in said housing.

References Cited in the file of this patent

UNITED STATES PATENTS

| | | |
|---|---|---|
| 332,150 | Holmes | Dec. 8, 1885 |
| 1,784,465 | Pepper | Dec. 9, 1930 |
| 2,379,124 | Wasson | June 26, 1945 |
| 2,510,473 | Jensen | June 6, 1950 |

FOREIGN PATENTS

| | | |
|---|---|---|
| 531,280 | Great Britain | Jan. 1, 1941 |